US011958180B2

(12) United States Patent
Gaddis et al.

(10) Patent No.: US 11,958,180 B2
(45) Date of Patent: Apr. 16, 2024

(54) ROTARY TOOL

(71) Applicant: TECHTRONIC CORDLESS GP, Anderson, SC (US)

(72) Inventors: Benjamin A Gaddis, Clemson, SC (US); Jesse J. Jerabek, Easley, SC (US); Jacob F. Creasman, Anderson, SC (US); Clinton C. Thackery, Clemson, SC (US); Brian D. Mertel, Simpsonville, WI (US); M. Grayson Jacoway, Mauldin, SC (US); William C. Buck, Clemson, SC (US); Eric K. Frazier, Easley, SC (US)

(73) Assignee: Techtronic Cordless GP, Anderson, SC (US)

( * ) Notice: Subject to any disclaimer, the term of this patent is extended or adjusted under 35 U.S.C. 154(b) by 900 days.

(21) Appl. No.: 16/417,228

(22) Filed: May 20, 2019

(65) Prior Publication Data

US 2020/0368892 A1 Nov. 26, 2020

(51) Int. Cl.
*B25F 5/02* (2006.01)
*B25H 3/00* (2006.01)

(52) U.S. Cl.
CPC ............. *B25F 5/029* (2013.01); *B25H 3/003* (2013.01)

(58) Field of Classification Search
CPC ................................ B25F 5/029; B25H 3/003
USPC ............................................................ 81/490
See application file for complete search history.

(56) References Cited

U.S. PATENT DOCUMENTS

| | | | | |
|---|---|---|---|---|
| 2,211,216 A * | 8/1940 | Oster | B23Q 11/0092 15/23 |
| 2,536,017 A | 1/1951 | Bamberger | |
| 2,840,673 A * | 6/1958 | Burton | F16C 1/08 439/312 |
| 3,851,126 A * | 11/1974 | Keller | F21V 23/04 200/329 |
| 4,179,632 A * | 12/1979 | Harvell | H02K 7/145 403/324 |
| 4,317,578 A | 3/1982 | Welch | |
| 4,932,294 A | 6/1990 | Chang | |
| 5,810,525 A | 9/1998 | Ector, Sr. | |
| 6,148,700 A * | 11/2000 | Upholz | B25B 27/302 81/486 |
| 6,634,262 B2 * | 10/2003 | Malchus | B25G 1/085 81/177.4 |

(Continued)

FOREIGN PATENT DOCUMENTS

| | | | |
|---|---|---|---|
| CN | 301334604 S | 3/2010 |
| CN | 201645388 U | 11/2010 |

(Continued)

*Primary Examiner* — Hadi Shakeri
(74) *Attorney, Agent, or Firm* — Michael Best & Friedrich LLP

(57) ABSTRACT

A rotary tool assembly includes a main body, a motor disposed in the main body, and a power source coupled to the main body. The power source being configured to provide electrical power to the motor. A rotary tool attached to the main body. The rotary tool configured to be actuated by the motor. A first bit storage area disposed on the main body. The first bit storage area being configured to receive a first bit. A second bit storage area disposed on the main body. The second bit storage area being configured to receive a second bit.

16 Claims, 12 Drawing Sheets

(56) References Cited

U.S. PATENT DOCUMENTS

| | | | | |
|---|---|---|---|---|
| 6,814,157 | B2 * | 11/2004 | Maras | B24B 27/027 173/171 |
| 7,217,069 | B2 * | 5/2007 | Dils | G01V 3/15 324/67 |
| 7,546,785 | B2 | 6/2009 | Roehm et al. | |
| 7,723,953 | B2 | 5/2010 | Roehm et al. | |
| 7,936,148 | B2 | 5/2011 | Roehm et al. | |
| D644,901 | S | 9/2011 | Christopher | |
| 8,157,092 | B2 | 4/2012 | Christopher | |
| D672,957 | S | 12/2012 | Christopher | |
| 8,468,915 | B2 | 6/2013 | Hu | |
| 8,727,118 | B1 | 5/2014 | Chen | |
| 9,121,438 | B2 * | 9/2015 | Mascari | A22C 17/12 |
| 2011/0175572 | A1 | 7/2011 | Roehm | |
| 2011/0226098 | A1 | 9/2011 | Zhang | |

FOREIGN PATENT DOCUMENTS

| | | | |
|---|---|---|---|
| CN | 201645471 | U | 11/2010 |
| CN | 202448182 | U | 9/2012 |
| DE | 10124440 | A1 | 11/2002 |
| DE | 202004021818 | U1 | 5/2011 |
| DE | 102011087294 | B4 | 5/2013 |
| EP | 2366500 | A2 | 9/2011 |
| EP | 2366501 | A2 | 9/2011 |
| EP | 3398727 | A1 | 11/2018 |
| GB | 2397513 | B2 | 7/2004 |
| WO | 2011017794 | A1 | 2/2011 |

* cited by examiner

ROTARY TOOL

FIELD OF THE DISCLOSURE

The present disclosure relates to rotary tools, and more particularly to rotary tools including improved bit storage and/or spindle locking capabilities.

BACKGROUND OF THE DISCLOSURE

Rotary tools typically include a power supply, a handle, a motor positioned within the handle, and an interchangeable bit holder. Rotary tools may accept a desired bit within the interchangeable bit holder and may be used to perform cuts, sand or polish objects, and/or drill holes.

SUMMARY OF THE DISCLOSURE

The present disclosure provides, in one aspect, a rotary tool assembly. The rotary tool assembly includes a main body, a motor disposed in the main body, and a power source coupled to the main body. The power source being configured to provide electrical power to the motor. A rotary tool attached to the main body. The rotary tool configured to be actuated by the motor. A first bit storage area disposed on the main body. The first bit storage area being configured to receive a first bit. A second bit storage area disposed on the main body. The second bit storage area being configured to receive a second bit.

The present disclosure provides, in another aspect, a rotary tool assembly. The rotary tool assembly includes a body, a motor disposed in the body, and a power source coupled to the body. The power source being configured to provide electrical power to the motor. A rotary tool attached to the body. The rotary tool configured to be actuated by the motor, and the rotary tool being configured to support and rotate a bit. A bit storage area disposed on the main body. The bit storage area being configured to receive the bit upon removal of the bit from the rotary tool.

In another embodiment, a rotary tool is disclosed. The rotary tool includes a body, a motor attached to the body, a rotary tool attached to the body. The rotary tool includes a spindle configured to be rotated by the motor and a slidable spindle lock switch disposed proximate to the spindle. The spindle rotates when the spindle lock switch is in a first position and the spindle stops rotating when the spindle lock switch is in a second position.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
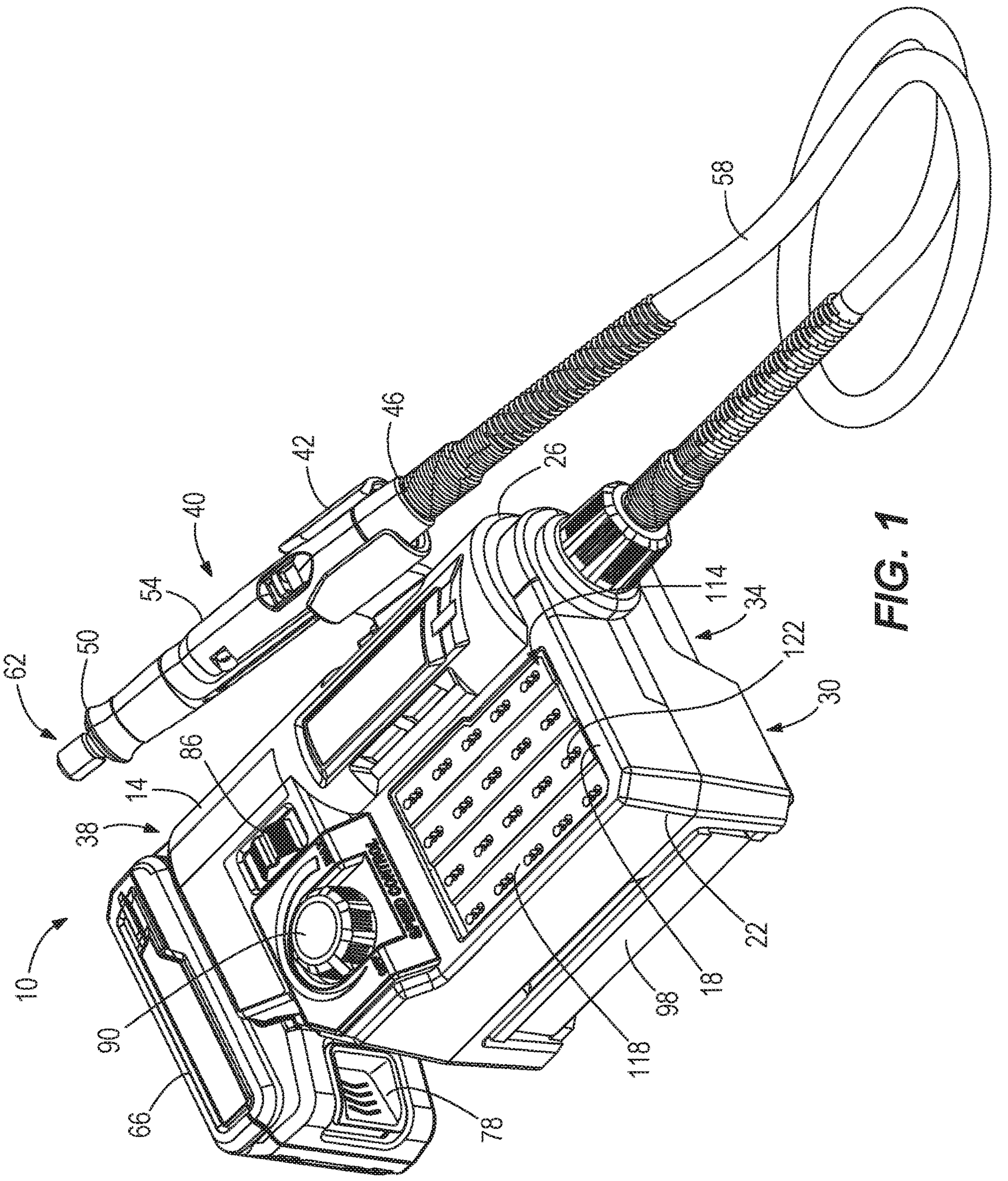
FIG. 1 is a perspective view of a rotary tool assembly according to one embodiment of the disclosure.

FIG. 1 illustrates a rotary tool assembly 10 according to one embodiment. The rotary tool assembly 10 may include a main body 14 having a top portion 18, a first side portion 22, a second side portion 26, a bottom portion 30, a front portion 34, and a rear portion 38. A rotary tool portion, such as a rotary tool 40, may be removably attached to a docking portion 42 that extends from the second side portion 26 of the main body 14. In the illustrated embodiment, the docking portion 42 is positioned at an angle with respect to the main body 14. The docking portion 42 may include a C-shaped structure, which engages with the rotary tool 40. In other embodiments, the docking portion 42 may be positioned on any surface of the main body 14 and comprise any suitable structure for facilitating the attachment and removal of the rotary tool 40 from the main body 14.

The rotary tool 40 may include a first end 46, a second end 50, and a handle 54 extending between the first end 46 and the second end 50. The first end 46 of the rotary tool 40 may be connected to a flexible member 58 that extends between portions of the rotary tool 40 and portions of the rotary tool assembly 10. The flexible member 58 may comprise a flexible conduit, cord, and/or the like. The flexible member 58 may extend from the front portion 34 of the main body 14 to the first end 46 of the rotary tool 40, in some embodiments. The flexible member 58, or a portion thereof, may be operably connected (e.g. electrically connected, physically connected, and/or the like) to a motor (not shown) positioned within the main body 14 of the rotary tool assembly 10. The second end 50 of the rotary tool 40 may include includes a bit holder assembly 62. The bit holder assembly 62 may removably accept any one of a variety of bits (not shown), and retain the bit during use of the rotary tool assembly 10. Portions of the bit holder assembly 62 may be caused to rotate and, thus, rotate the bit disposed therein for performing an operation (e.g., a clearing operation, a cutting operation, a grinding operation, and/or the like). The bit holder assembly 62 may be caused to rotate by the motor, to which the bit holder assembly 62 is operatively connected by way of connection to the flexible member 58.

Figure 2:
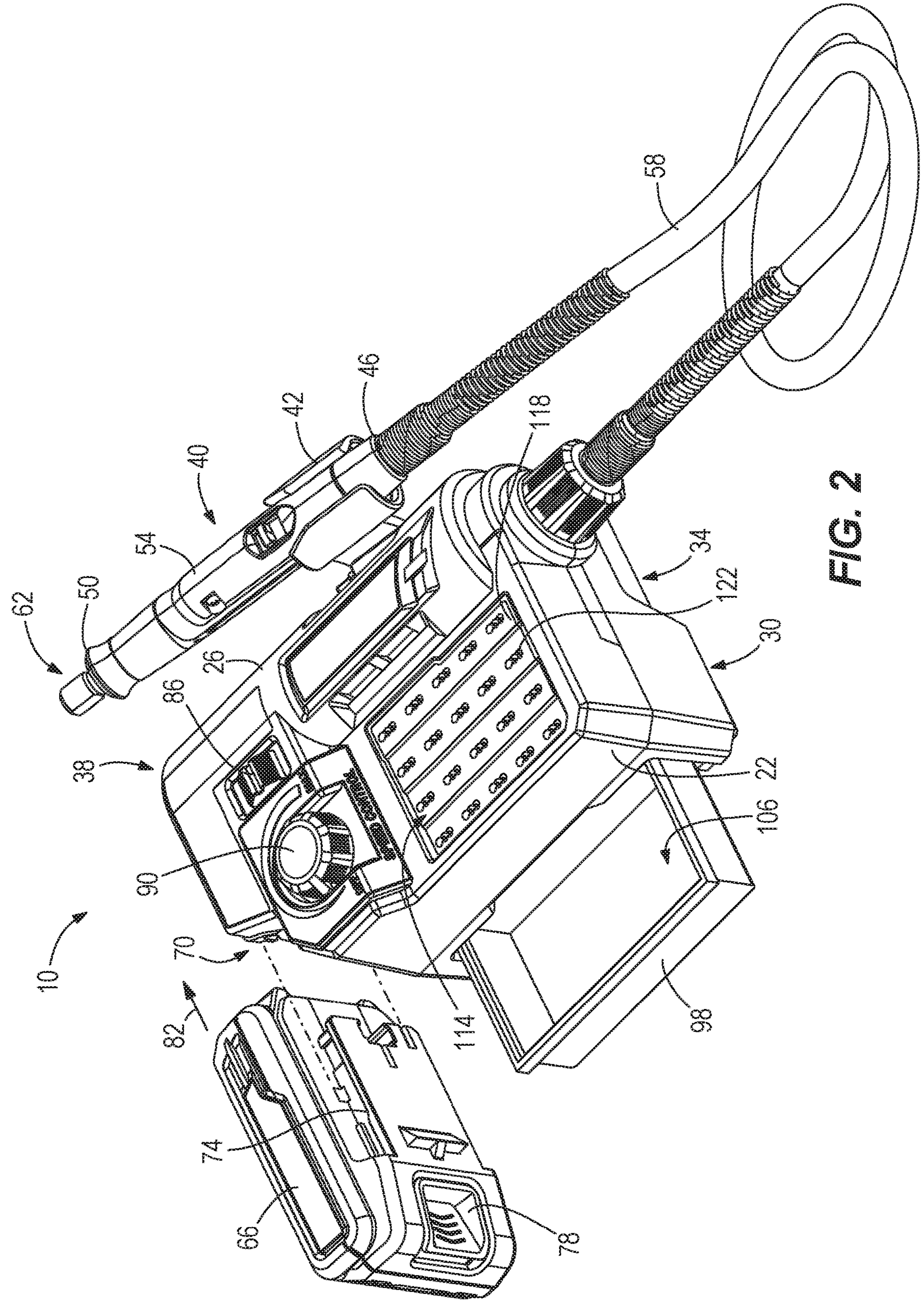
FIG. 2 is a perspective view of the rotary tool assembly of FIG. 1 with a first bit storage area open.

Referring to FIGS. 1 and 2, a battery 66 may be removably attached to a battery connection portion 70 (e.g., a receptacle) positioned on the main body 14. The battery connection portion 70 may be located on a side, front, and/or rear portion of the main body 14. The battery 66 is a power source that may be operably connected to the motor for providing power thereto. The battery 66 may include connection slides 74 and a release member 78 (e.g., a release button, a release lever, and/or the like) to selectively secure the battery 66 to the main body 14. The battery connection portion 70 may include matching connection slides (not shown), which selectively engage with the connection slides 74 of the battery 66 during the attachment of the battery 66 (FIG. 2) to the main body 14. As such, the battery 66 connection portion 70 may receive the battery 66 in a slidable fashion (e.g., the battery being horizontally slidable, vertically slidable, and/or the like), for example, as shown by arrow 82, which allows the rotary tool assembly 10 to have a more compact size, shape, footprint, and/or the like. Additionally, the angle of the docking portion 42 may allow the battery 66 to be inserted in the horizontal fashion without obstruction by the rotary tool 40. In other embodiments, the battery 66 may be received at an angle with respect to the main body 14 in a range from about −5 degrees to 5 degrees from horizontal. Other angles are contemplated.

In some embodiments, the battery 66 may include one or more battery cells. For example, the battery pack may be a 12-volt battery pack and may include three (3) Lithium-ion battery cells. In other embodiments, the battery pack may include fewer or more battery cells such that the battery pack is a 14.4-volt battery pack, an 18-volt battery pack, or the like. Additionally, or alternatively, the battery cells may have chemistries other than Lithium-ion such as, for example, Nickel Cadmium, Nickel Metal-Hydride, or the like. Additionally, or alternatively, the rotary tool assembly may use a power source such as a cord providing an alternating current power supply, e.g., from a utility source such as a standard outlet, and may include a transformer as necessary.

The main body 14 may further include a power switch 86 for selectively providing electric power from the battery 66 to the motor and a speed switch 90 for selectively controlling the rotational speed of the rotary tool 40. In the illustrated embodiment, the power switch 86 is slidable between an off position and an on position. The speed switch 90 is a dial rotatable between a minimum speed and a maximum speed. In some embodiments, the speed switch 90 may have preset speed settings (e.g. RPM settings) which the speed switch 90 is rotatable between. In some embodiments, the power switch 86 and/or the speed switch 90 may be formed as a push-button switch, a flip-type switch, a toggle switch, a rotatable switch, a touch-screen enabled switch, and/or the like.

Figure 4:
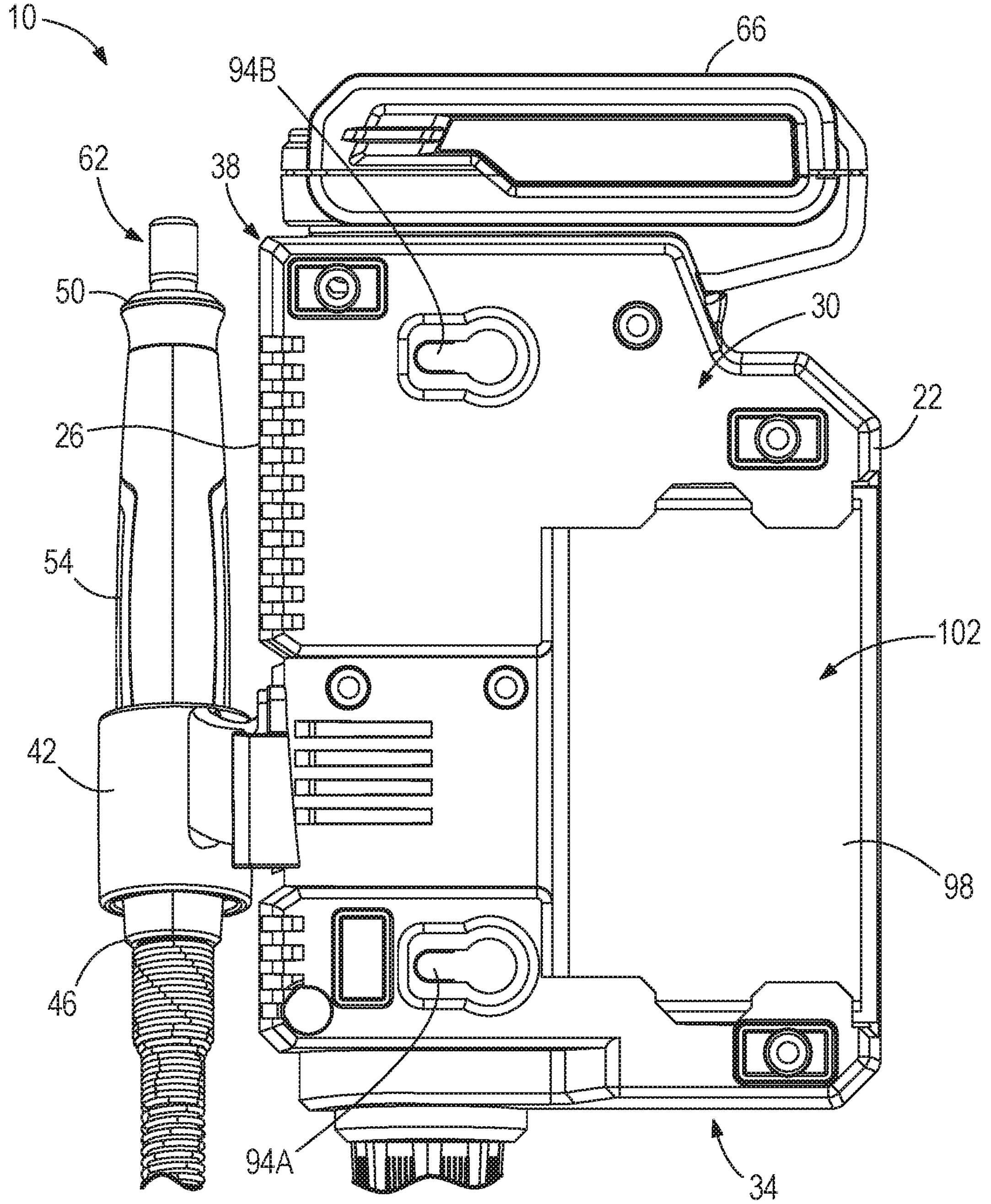
FIG. 4 is a bottom view of the rotary tool assembly of FIG. 1 with the first bit storage area closed.

Referring to FIG. 4, the bottom side of the main body 14 may include mounting apertures 94. The mounting apertures 94 are configured to accept a fastener (e.g., a screw, a nail, a hook, and/or the like) to allow the rotary tool assembly 10 to be mounted on or over a surface (not shown, e.g., a wall, a door, a shelf, pegboard, and/or the like). The mounting apertures 94 may be positioned to provide stable support of the rotary tool assembly 10 while the rotary tool is mounted. In the illustrated embodiment, the mounting apertures 94 include two mounting apertures, a first aperture 94A positioned adjacent the front portion 34 and a second aperture 94*b* positioned adjacent the rear portion 38 of the main body 14. The positioning of the mounting apertures provides stable support of the rotary tool assembly 10. In other embodiments, the bottom portion 30 of the main body 14 may include fewer or additional apertures to allow the rotary tool assembly 10 to be mounted in other positions. The apertures 94 may be provided in any desired location and/or orientation, including a location and/or orientation that is different than that shown in FIG. 4.

Referring to FIGS. 1-4, the rotary tool assembly 10 may additionally include at least one bit storage area, such as a first bit storage area 98 and/or a second bit storage area 114. The first bit storage area 98 may be removably coupled to the main body 14 via moving (e.g., sliding) respective to a cavity 102 (FIG. 4) that is formed in and/or extends through the main body 14. The first bit storage area 98 may include a storage container, bin, drawer, or storage cavity 106 (see, e.g., FIGS. 2 and 5) that may receive and contain items such as bits, fasteners, tools (e.g., hex keys, wrenches, screwdrivers, and/or the like) and/or the like. In the illustrated embodiment, the first bit storage area 98 may include a container or bin that removably attaches to the main body 14 via a friction fit within the cavity 102 of the main body 14, a tongue-and-groove fit within the cavity 102 of the main body 14, and/or the like. In other embodiments, the first bit storage area 98 may be formed as a reversible bin with storage areas on the top portion 18 and/or the bottom portion 30, and/or the first bit storage area 98 may include multiple bins (e.g. multiple bins positioned side by side, multiple bins positioned on multiple sides of the rotary tool assembly 10, multiple bins positioned on top of each other, and/or the like), and/or the first bit storage area 98 may include multiple compartments for organizing and storing different items. In some embodiments, the cavity 102 may extend through the front portion 34, the rear portion 38, or the first side portion 22 of the main body 14. As such, the first bit storage area 98 may be removable in different orientations.

In some embodiments, the first bit storage area 98 may be slidable and slidably couple to the cavity 102 via sliding portions 110 (FIG. 5) positioned within the cavity 102 of the main body 14. As such, the first bit storage area 98 is movable between a first position (FIG. 1), which the storage cavity 106 is positioned within the cavity 102 of the main body 14, and a second position (FIG. 2), which the storage cavity 106 is at least partially removed from (e.g., and/or positioned outside of) the cavity 102 of the main body 14. When the first bit storage area 98 is in the second position, items may be added or removed from the storage cavity 106 of the first bit storage area 98. In some embodiments, the first bit storage area 98 may include a stop (not shown) that secures the first bit storage area 98 at least partially within the cavity 102 when the first bit storage area 98 is in the second position. The first bit storage area 98 may also include a locking mechanism whereby the first bit storage area 98 may be locked or secured in the first position.

Still referring to FIGS. 1-4 in general, the rotary tool assembly 10 may further includes a second bit storage area 114 positioned on the top portion 18 of the main body 14. The second bit storage area 114 may include a support surface, such as a tray 118, or a tray-like surface, having apertures 122 formed therein. Such apertures 122 may be configured to receive a bit (see e.g., 158, FIG. 6) in a vertical or upright position. The tray 118 may be constructed of an elastomeric material that allows the bits (e.g., the bit shafts) to be securely received within the respective aperture 122. In other embodiments, the tray 118 may be formed of any material that sufficiently secures the bits within the apertures 122 (e.g., a gripping material, a flexible material and/or the like).

In some embodiments, the tray 118 may be removably coupled to the main body 14. In the illustrated embodiment the tray 118 is press fit into the main body 14. The tray 118 may be removable from the main body 14 for providing access to an additional storage area or cavity 126 (e.g., a storage area or cavity that underlies the tray, see e.g., FIG. 5) of the second bit storage area 114 (e.g., to clean the storage area cavity). In other embodiments, the tray 118 may be removed to access additional storage in the cavity 126. In some embodiments, the tray 118 may be connected to the body via a hinge, a snap fittings, or the like. Additionally, the tray 118 may be removable or openable (e.g., via lifting one or more covers or hinged doors) to allow for additional storage in the cavity 126 of the second bit storage area 114.

Figure 3:
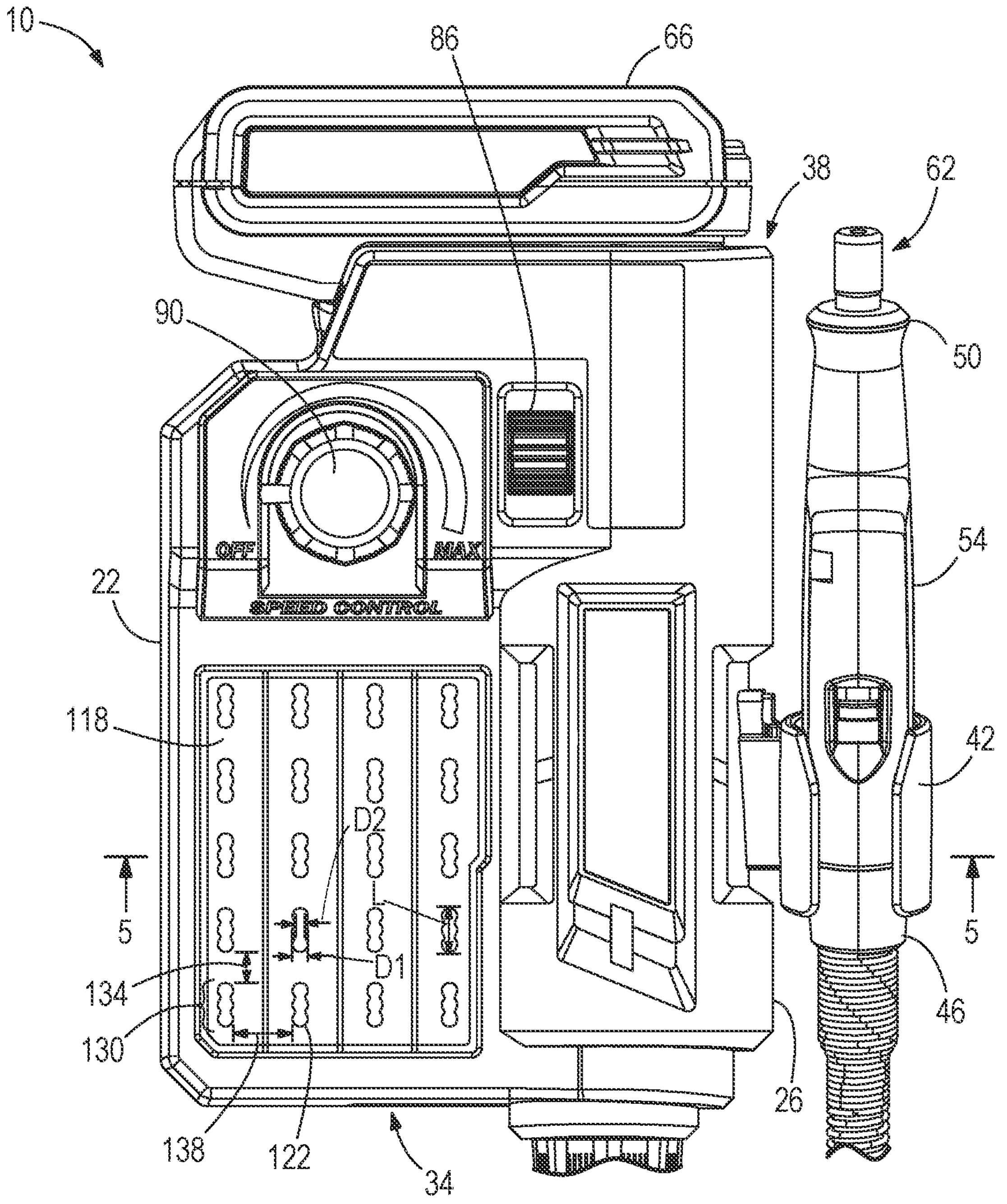
FIG. 3 is a top view of the rotary tool assembly of FIG. 1.
Figure 10:
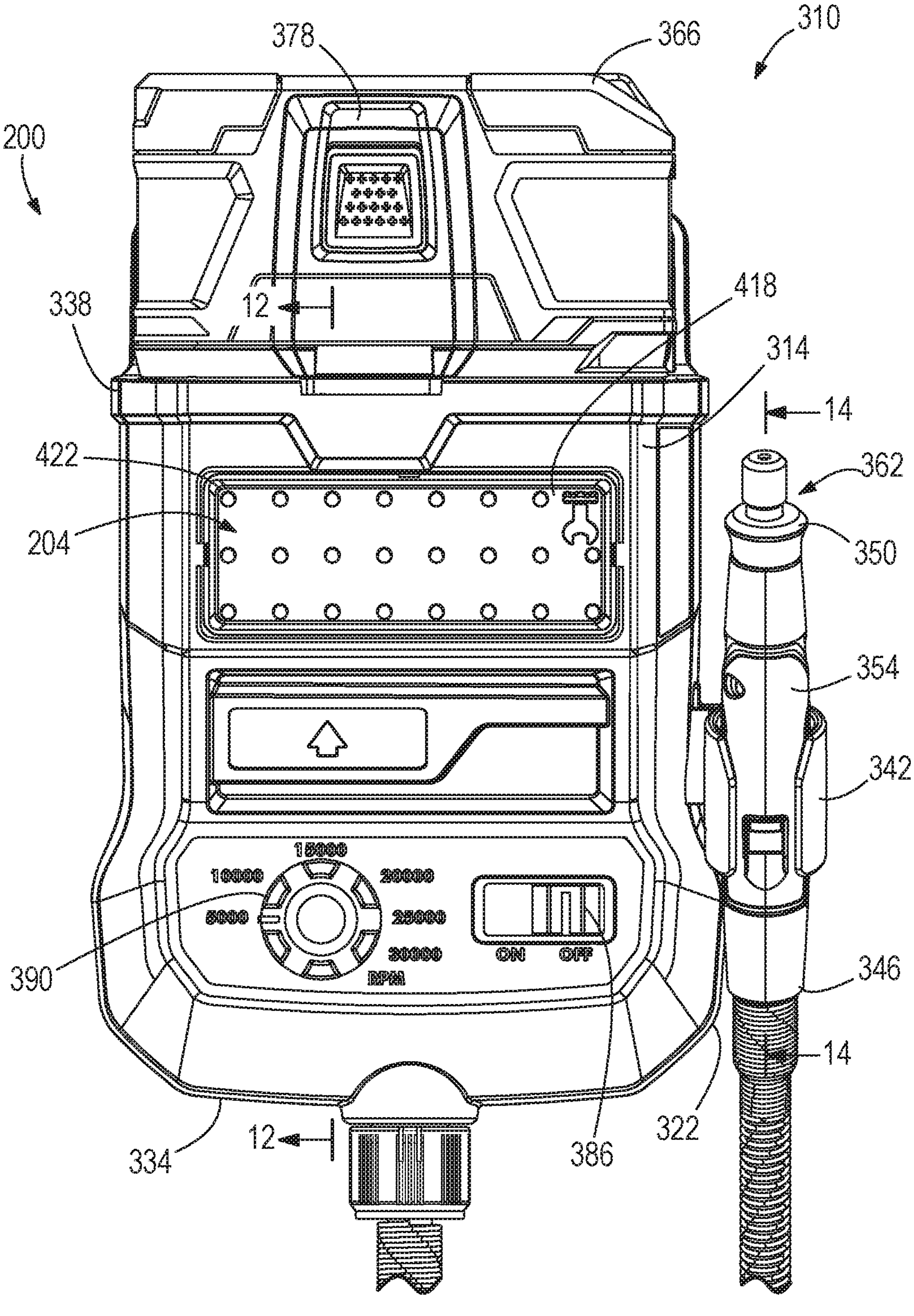
FIG. 10 is a top view of the rotary tool assembly of FIG. 9.

Referring to FIG. 3, the apertures 122 may be positioned on the tray 118 as a group of apertures 130. In the illustrated embodiment, the groups of apertures may include two, three, or more than three apertures. Although the apertures 130 are shown in groups, single apertures 130 may be provided (see, e.g., FIG. 10). Additionally, apertures 130 may be provided in a repeating pattern or a random pattern that is different than the repeating pattern shown in FIG. 3. The apertures 130 may include openings having opposite sides or surfaces that are substantially parallel (e.g., providing apertures with a uniform diameter along a length of the apertures) or openings having opposite sides or surfaces that are non-parallel (e.g., tapered surfaces providing apertures with a non-uniform diameter [e.g., D1, D2] along a length L of the apertures) between which a shaft (e.g., a shaft portion 154, FIG. 6) of a bit may be gripped and/or retained. The apertures 130 may include a same diameter, or different diameters. In some embodiments, the tray 118 includes a first spacing 134 and a second spacing 138 between adjacent apertures 130 and/or groups of apertures 130 to create separation between the adjacent apertures 130 and/or groups of apertures 130. In other embodiments, the apertures 130 may be positioned in any arrangement on the tray 118 of the second bit storage area 114 to efficiently store the bits. The group of apertures 130 may include any number of apertures (e.g., one, two, four, five, etc. apertures in each group of apertures).

Figure 5:
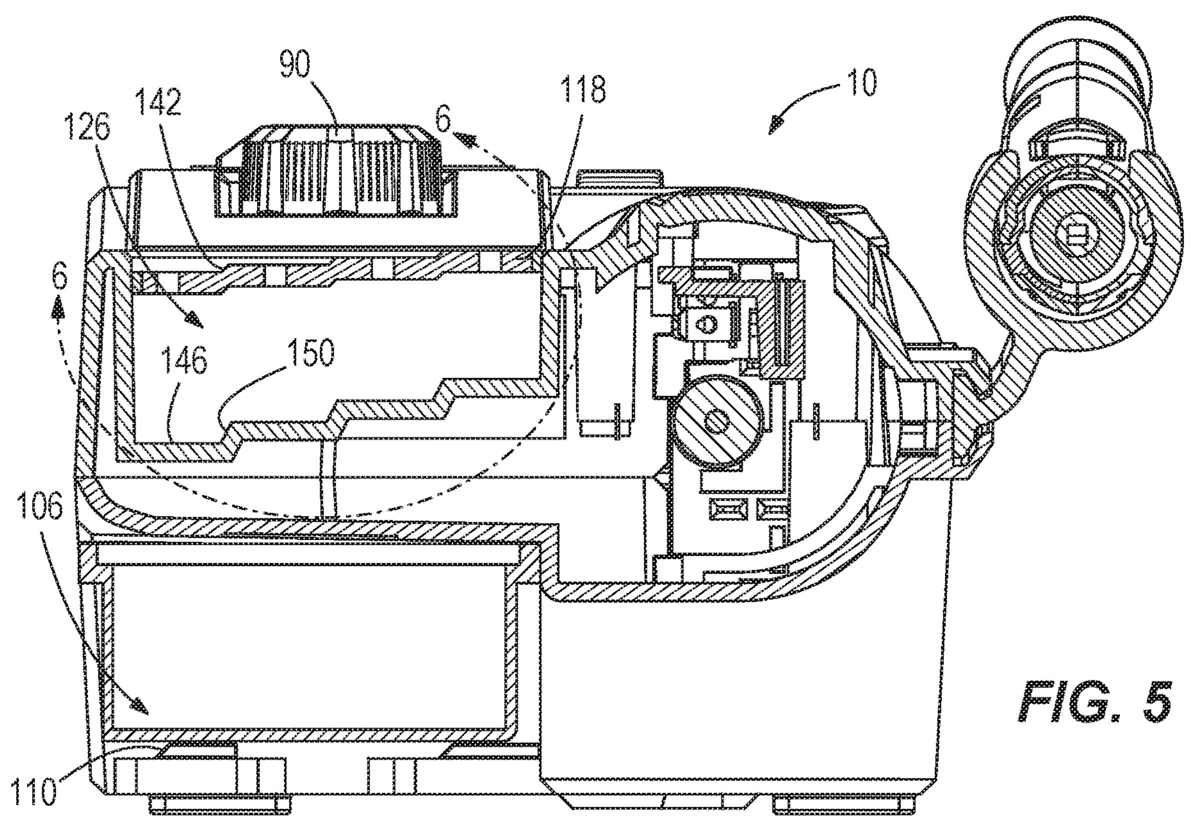
FIG. 5 is a cross-sectional side view of the rotary tool assembly of FIG. 1.
Figure 6:
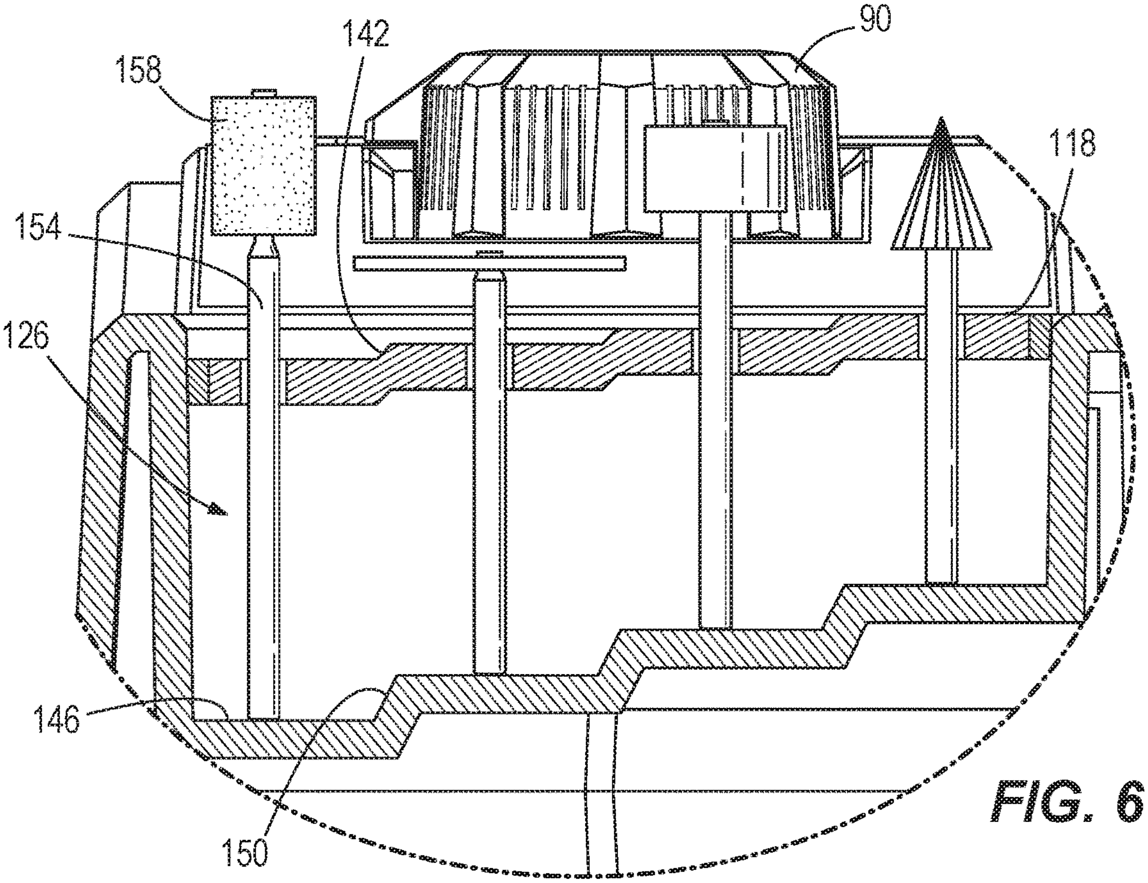
FIG. 6 is an enlarged cross-sectional side view illustrating a second bit storage area of the rotary tool of FIGS. 1 and 5.

Referring to FIGS. 5 and 6, the tray 118 of the second bit storage area 114 may include a planar surface, a non-planar surface, and/or a combination of planar and non-planar surfaces through which the one or more bits may be disposed. For example, the bit storage area 114 may include a first plurality of stepped surfaces 142, which may collectively angle, taper, slope, or step downward towards a side or edge of the rotary tool assembly 10. The cavity 126 may include a bottom surface 146 having a planar surface, a non-planar surface, and/or a combination of planar and non-planar surfaces on or over which the one or more bits may be disposed. The stepped surfaces of the bottom surface 146 can be, but do not have to be, substantially parallel to stepped surfaces of the tray 118. For example, in some embodiments, the bottom surface 146 includes a second plurality of stepped surfaces 150. The first plurality of stepped surfaces 142 of the tray 118 may occur concurrently with the second plurality of stepped surfaces 150 of the bottom surface 146. In the illustrated embodiment, the first plurality of steps includes a smaller increase in height compared to the second plurality of steps. In other embodiments, the first plurality of steps may include a larger increase of height or the same increase in height as the second plurality of steps. In some embodiments, the tray 118 may be formed without the first plurality of steps or the second plurality of steps. In some embodiments, the tray 118 may be formed with curved surfaces, inclined surfaces, and/or the like.

The apertures 130 (FIG. 3) are configured to receive, retain, and/or support at least one bit having a shaft portion 154 and a head portion 158 (FIG. 6). When a selected aperture receives a bit, the shaft portion 154 may engage with the bottom surface 146 of the storage cavity 106. The first plurality of stepped surfaces 142 and the second plurality of stepped surfaces 150 allow for the bits to sufficiently enter the cavity 126 and for the bits to be positioned at varying heights with respect each other. In this way, a larger quantity of bits and/or many different sizes and/or shapes of bits may be conveniently and efficiently stored in a smaller, compact region of the rotary tool assembly 10.

The separation created by the first spacing 134 and the second spacing 138 allows for the bits to be positioned within the second bit storage area 114 without the head portion 158 of the bits interfering with adjacent bits. Additionally, the group of apertures 130 further allow for adjustment of the bits. For example, a location of a bit may be adjusted between any one of the three apertures of the group of apertures 130 to allow for micro-adjustment of the bits. Such micro-adjustment allows for improved (e.g., reduced, optimized, and/or the like) spacing between bits. As such, the bits may be efficiently positioned within the second bit storage area 114. The apertures 130 may be formed from a flexible gripping material (e.g., plastic, rubber, foam) and/or surfaces of the apertures 130 may be coated with a gripping material for improved bit retention.

Figure 7:
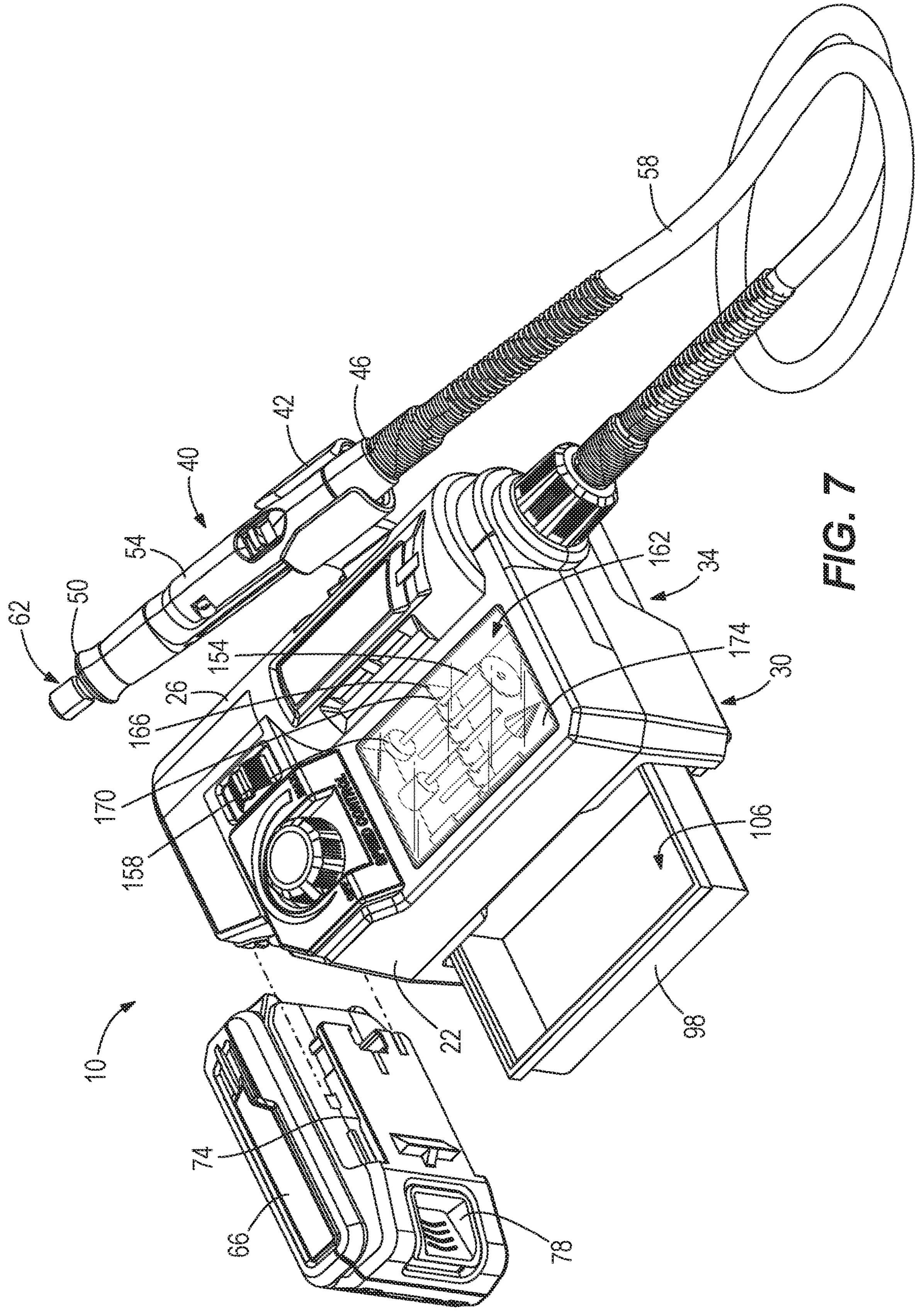
FIG. 7 is a perspective view of a rotary tool assembly according to another embodiment of the disclosure.

Referring to FIG. 7, the second bit storage area may include and/or be formed as a bit storage area 162 positioned under or in place of the second bit storage area 114 illustrated in FIGS. 1-5. In the illustrated embodiment, the bit storage area 162 is in place of the second bit storage area 114. The bit storage area 162 includes a securing area or structure 166 that includes securing apertures 170. The securing apertures 170 may receive a shaft portion 154 of a respective bit.

The bits may be arranged such that the head portions 158 of each of the bits may be orientated in an alternating configuration to allow for efficient spacing of the bits. In the illustrated embodiments, the bit storage area 162 includes a cover or lid 174 to further secure the plurality of bits. In some embodiments the lid 174 may be constructed to include a plurality of apertures in a similar fashion as the tray 118. As shown in FIGS. 1-7, two or more bits may be stored such that respective shafts of the two or more bits are substantially parallel to each other, which may improve the storage and/or visibility of the bits. In this way, a user may more efficiently retrieve a bit during use of the rotary tool assembly 10.

Figure 8:
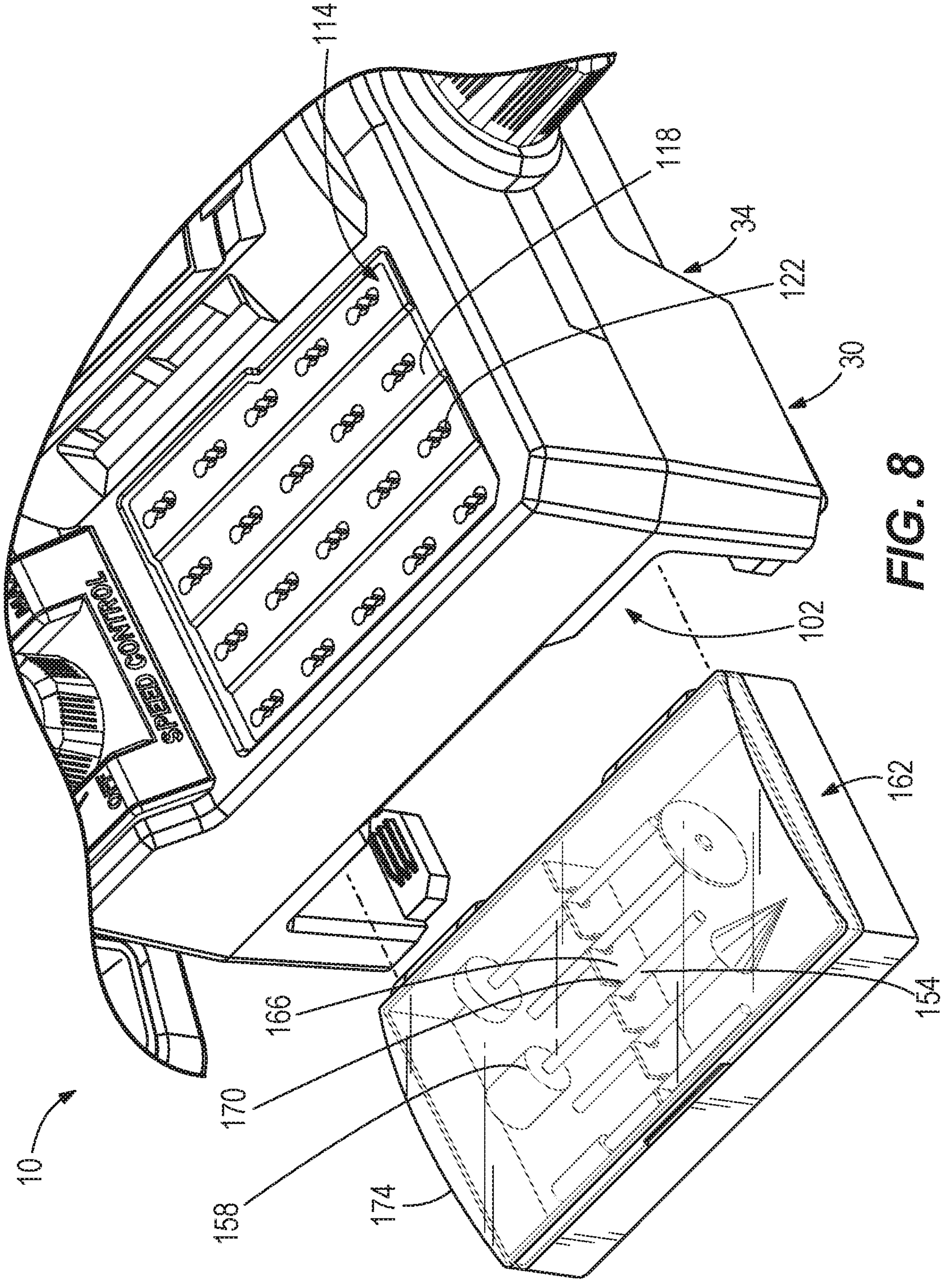
FIG. 8 is a perspective view of a rotary tool assembly according to another embodiment of the disclosure.
Figure 9:
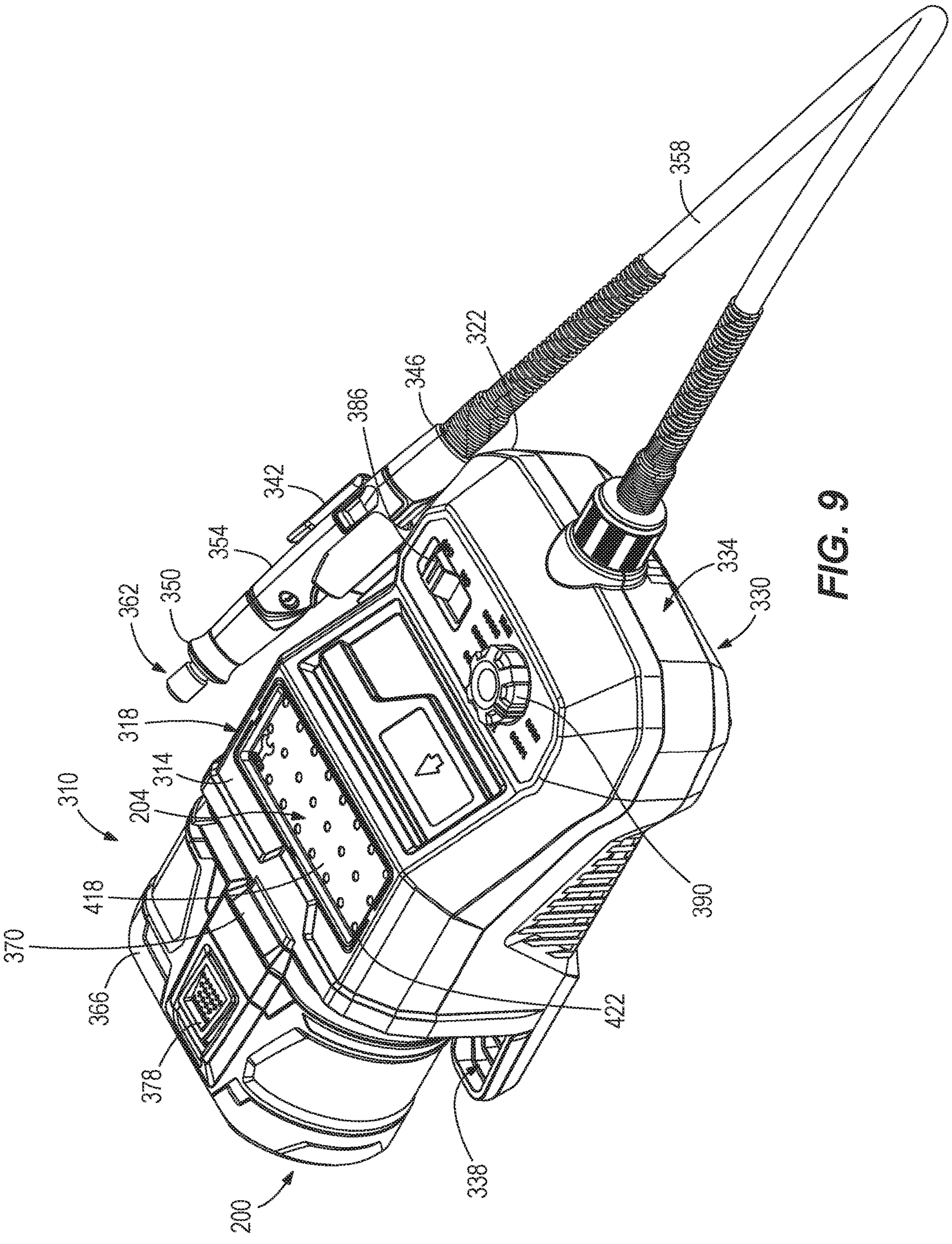
FIG. 9 is a perspective view of a rotary tool assembly according to another embodiment of the disclosure.

Referring to FIG. 8, the rotary tool assembly 10 may include a bit storage area 162 similar to the one shown in FIG. 7. The bit storage area 162 may be slidably coupled to the cavity of the main body 14. In some embodiments, the bit storage area 162 may be positioned above or below the first bit storage area illustrated in FIG. 1-5. In such embodiments, the rotary tool assembly 10 may include three or more separate storage areas.

FIGS. 9-13 illustrate a rotary tool assembly 310 according to another embodiment. The rotary tool assembly 310 is similar to the rotary tool assembly 10 described above with reference to FIGS. 1-8, and the following description focuses primarily on differences between rotary assembly 10 and rotary assembly 310. In addition, common features and elements of the rotary tool assembly 310 corresponding with features and elements of the rotary tool assembly 10 are common reference numbers plus 300. Any other features are numbered with reference numbers between 200 and 300.

The rotary tool assembly 310 includes a main body 314 having a top portion 318, a side portion 322, a bottom portion 330, and a rear portion 338. A rotary tool 340 is removably attached to a docking portion 342 extending from the side portion 322 of the rotary tool assembly 310. A battery 366 is removably attached to a battery connection portion 370 positioned in the rear portion 338 of the rotary tool assembly 310. The battery 366 includes one or more release members 378 to selectively secure the battery to the rotary tool assembly 310. The release members 378 may be positioned on opposite sides of the battery. The battery connection portion 370 is configured to receive the battery along an arrow 200.

The main body may further include a power switch 386 that selectively provides electric power from the battery 366 to a motor positioned within the main body 314 and a speed switch 390 for selectively controlling the rotational speed of a rotary tool 340. In the illustrated embodiment, the power switch 386 is slidable between an off position and an on position. The speed switch 390 is a knob rotatable between a plurality of speed settings. The speed settings range from 500 RPM to 30000 RPM in increments of 500 RPM. In other embodiments, the speed settings may include various speed settings based on the application of the rotary tool. The power switch 386 and/or the speed switch 390 may be formed as a push switch, a toggle switch, and/or the like.

A bit storage area 204 is positioned on the top portion 318 of the main body 314. The bit storage area 204 includes a support surface, such as a tray 418, having one or more apertures 422 formed therein for receiving one or more respective bits. The tray 418 may be removably coupled to the main body 314. In the illustrated embodiment, the tray 418 is attached to the main body 314 via a snap fit interface. The tray 418 is removable from the main body 314 and provides access to a storage area cavity 426 (FIGS. 12-13) of the bit storage area 204 (e.g., to clean the storage area cavity). In other embodiments, the tray 418 may be removed to access additional storage in the storage area cavity 426. In some embodiments, a second bit storage area similar to the second bit storage area 114 or the bit storage area 162 may be positioned on the main body 314.

Figure 11:
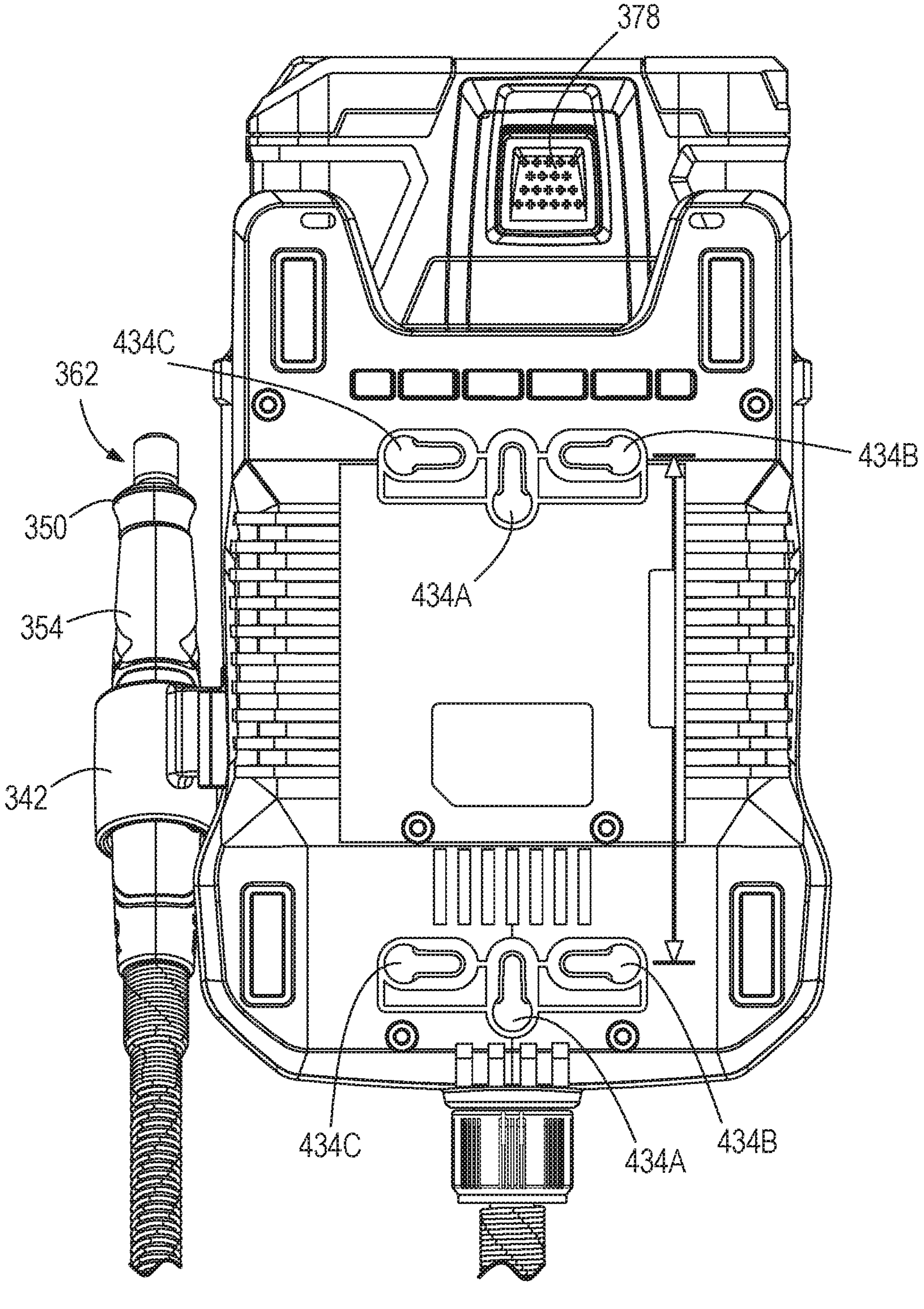
FIG. 11 is a bottom view of the rotary tool assembly of FIG. 9.
Figure 12:
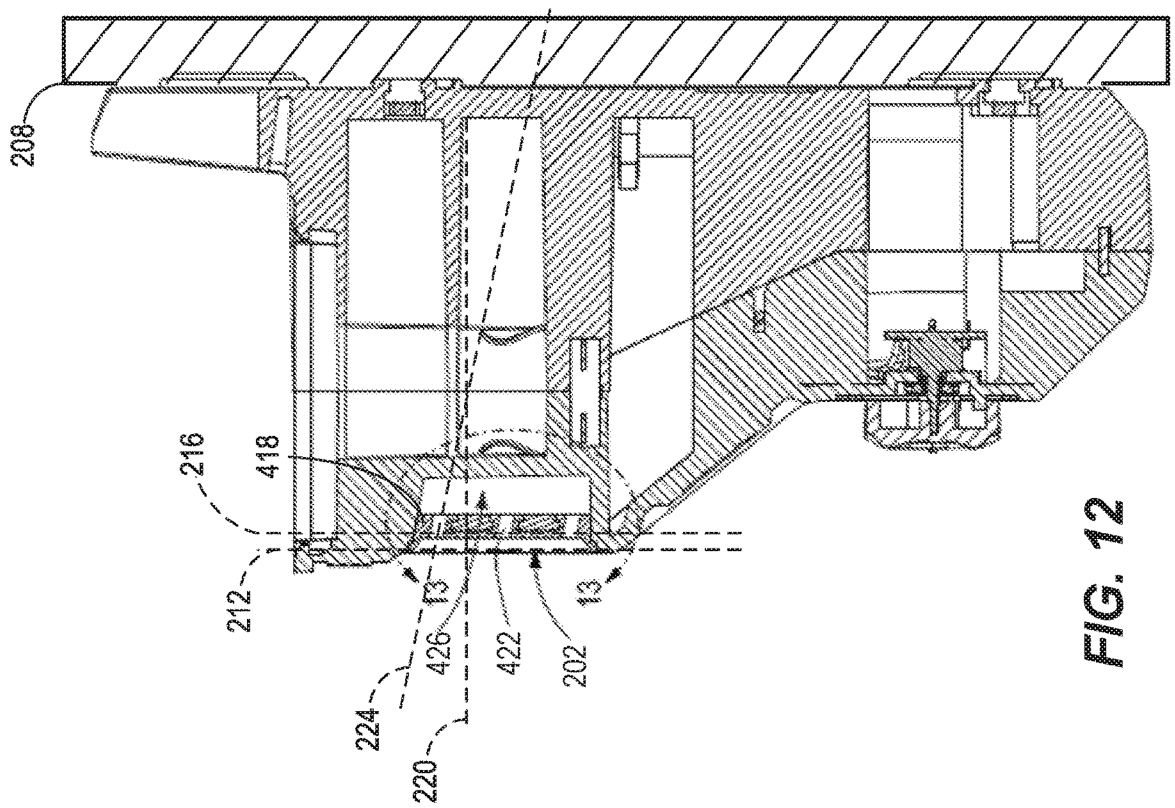
FIG. 12 is a cross-sectional side view of the rotary tool assembly of FIG. 9.

Referring to FIG. 11, the bottom portion 330 of the main body may include one or more mounting apertures 434. The mounting apertures 434 are configured to accept a fastener (e.g., a screw) to mount the rotary tool assembly 310 a wall or surface 208 (FIG. 12). The mounting apertures 434 may include a first set of mounting apertures 434A, a second set of mounting apertures 434B, a third set of mounting apertures 434C. More or less than three sets of apertures 434 may be provided, in some embodiments. The first set of mounting apertures 434A are configured to mount the rotary tool assembly 310 in a vertical position. The second set of mounting apertures 434B are configured to mount the rotary tool assembly 310 in a first horizontal position. The third set of mounting apertures 434C are configured to mount the rotary tool assembly 310 in a second horizontal position. In other embodiments, additional mounting apertures may be positioned in orientations to allow the rotary tool assembly to be mounted in various positions.

Figure 13:
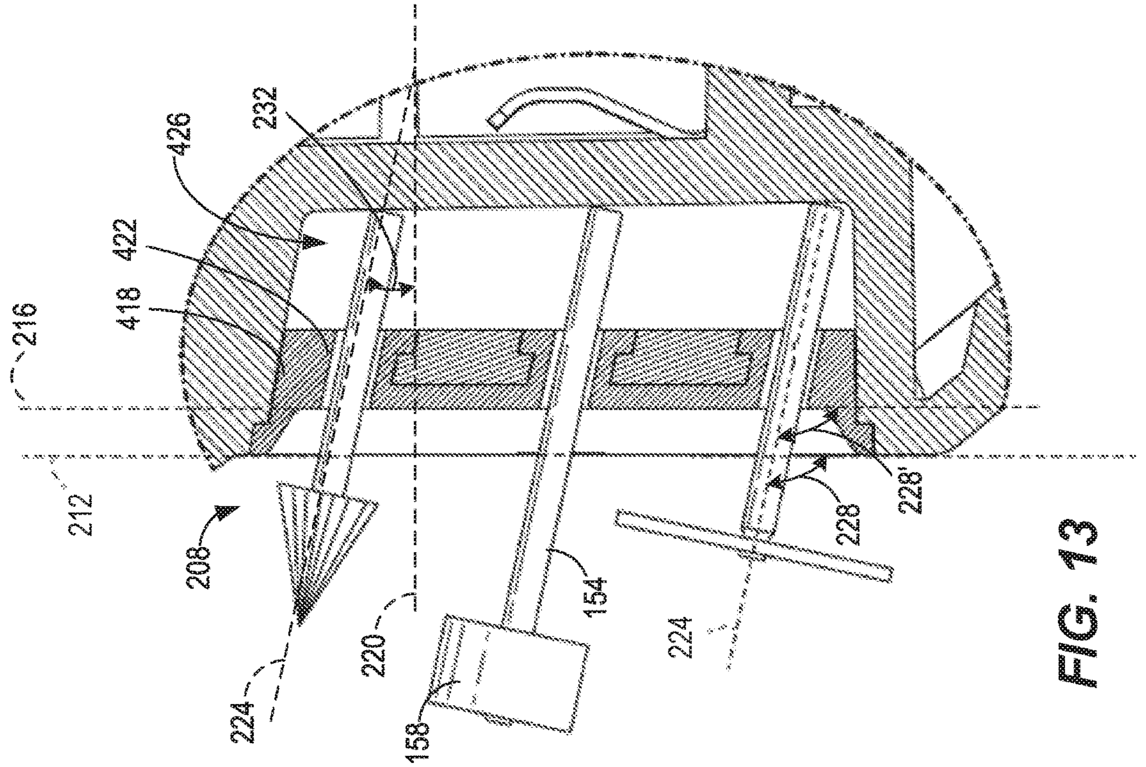
FIG. 13 is an enlarged view illustrating a bit storage area of the rotary tool assembly of FIGS. 9 and 12.

Referring to FIGS. 12 and 13, the rotary tool assembly 310 is positioned in a vertical orientation (e.g., illustrating the position of the rotary tool assembly mounted on a surface 208). The top portion 318 of the main body defines a top portion axis 212, which is generally vertical when the rotary assembly 310 is mounted on a surface 208. The tray 418 defines a tray axis 216, which is generally parallel with the top portion axis 212. A generally horizontal axis 220 is positioned generally perpendicular to the tray axis 216 and the top portion axis 212. The generally horizontal axis 220 is perpendicular to the surface 208. The apertures 422 define an aperture axis 224 along which the received bits extend.

The aperture axis 224 may be positioned at an oblique angle 228 relative to the top portion axis 212. The tray axis 216 may be generally parallel to the top portion axis 212. As such, the oblique angle 228 may be approximately equal to an oblique angle 228'. In the illustrated embodiment, the oblique angle 228 may be approximately 105 degrees. In other embodiments, the oblique angle 228 may be in a range from about 95 degrees to about 105 degrees. In other embodiments, the oblique angle 228 may be in a range from about 105 degrees to about 120 degrees. In some embodiments, the tray axis 216 may be positioned from a range of between about −5 degrees and about 5 degrees relative to the top portion axis 212.

The aperture axis 224 may be positioned at an acute angle 232 relative to the generally horizontal axis 220. The aperture axis 224 may be positioned at an acute angle 232 relative to the generally horizontal axis 220. In the illustrated embodiment, the acute angle 232 is approximately 15 degrees. In some embodiments, the acute angle 232 may range from about 5 degrees to about 15 degrees. In some embodiments, the acute angle 232 may range from about 15 degrees to about 30 degrees.

The oblique angle 228 of the aperture axis 224 relative the top portion axis 212 and the tray axis 216 is configured to improve retention of the bits within the bit storage area 204. Specifically, when the rotary tool assembly 310 is mounted to the surface 208, the oblique angle 228 of the aperture axis 224 may prevent the bits from falling out of the bit storage area 204. When a bit includes a large head portion 158 (FIG. 13), gravity tends to urge the bit downward and out of the respective aperture 422. The oblique angle 228 allows the bits to be effectively secured without the need of applying excessive grip material or overly small apertures. As such, the oblique angle 228 allows the bits to be removed more easily while also sufficiently securing the bits within the bit storage area 204.

Figure 14:
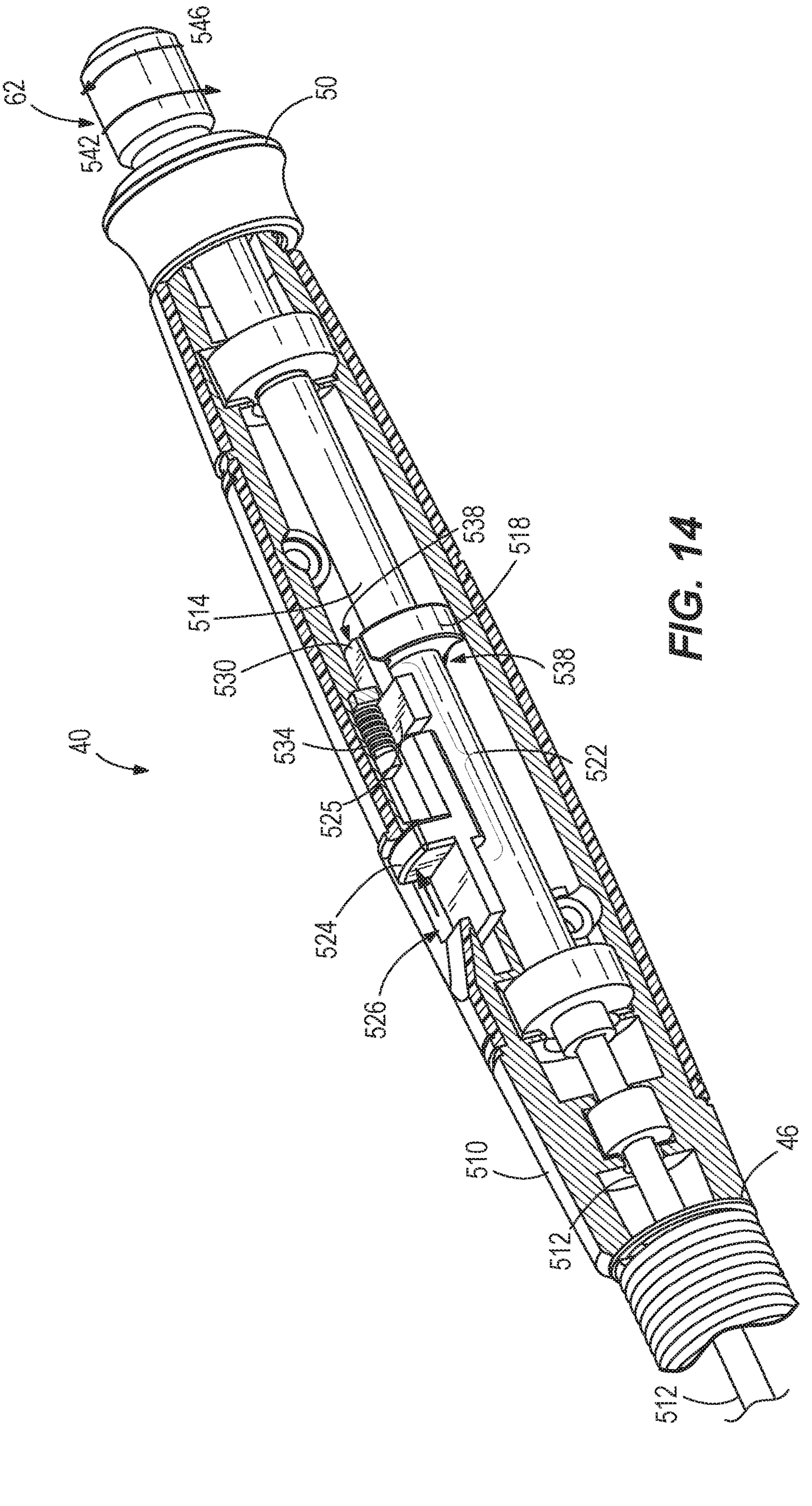
FIG. 14 is a perspective view of a rotary tool portion of the rotary tool assembly.

FIG. 14 illustrates the internal components of the rotary tool 40. The rotary tool 40 may include a housing 510 and a spindle 514 positioned within the housing 510, the spindle 514 may be rotatably connected to a shaft 512 (e.g., a shaft disposed in the flexible member 58, FIG. 1) that causes rotation of the spindle 514. The rotary tool 40 may additionally include a locking structure 518 positioned on, over, and/or around the spindle 514, and a spindle lock switch assembly 522 at least partially positioned in a recess 526 of the housing 510. The spindle lock switch assembly 522, or a portion thereof, is configured to engage or disengage from the locking structure 518 of the spindle 514 for causing the spindle 514 to respectively lock (e.g., not rotate) or unlock (e.g., rotate).

In some embodiments, the spindle lock switch assembly 522 may include a slidable switch member 524 and a locking member 525. The slidable switch member 524 and the locking member 525 may be integrally formed as a single structure from a same material or the slidable switch member 524 and the locking member 525 may be formed as separate structures from different materials (e.g., slidable switch member 524 may be formed from plastic and locking member 525 may be formed from metal). In some embodiments, the portions of material forming the slidable switch member 524 and the locking member 525 may be attached via bonding, molding, welding, and/or the like. In this way, moving (e.g., sliding) the slidable switch member 524 may move the locking member 525 towards or away from the locking structure 518 of the spindle 514. The spindle 514 may be connected to the bit holder assembly 62 via threading, machining, press fitting, and/or the like, for rotating a bit disposed in the bit holder assembly 62.

The spindle lock switch assembly 522 may be slidably movable relative to the housing 510 to engage with the locking structure 518 and to prevent rotation of the spindle 514. In the illustrated embodiment, the locking member 525 of the spindle lock switch assembly 522 may include a projection 530. A biasing member 534 (e.g., a spring) may be disposed on or over the spindle lock switch assembly 522, or a portion thereof, for biasing the slidable switch member 524 of the spindle lock switch assembly 522 towards an unlocked position, which in turn allows rotation of the spindle 514.

The locking structure 518 of the spindle 514 may include a collar, or a collar-type structure, that includes one or more locking recesses 538, which are configrued to accept the projection 530 of the spindle lock switch assembly 522. The spindle lock switch assembly 522 may be slidably movable relative to the housing 510 between a first position (e.g., an unlocked position) and a second position (e.g., a locked position shown in FIG. 14). When the spindle lock switch assembly 522 is moved to the locked position (FIG. 14), a portion of the bit holder assembly 62 (e.g., a collet nut) may be moved (e.g., rotated) relative to the spindle 514. The portion of the bit holder assembly 62 may be moved in a first direction 542, which loosens the bit holder assembly 62 for insertion of a bit. Once the bit is inserted within the bit holder assembly 62, the portion of bit accepting holder may be moved in a second direction 546 (e.g., opposite the first direction 542) to secure the bit within the bit holder assembly 62. The spindle lock switch assembly 522 may remain in the locked position until the spindle lock switch assembly 522 is slidably moved towards the first position. The biasing member 534 may bias the spindle lock switch assembly 522 in the first position.

In operation, the rotary tool assemblies 10, 310 may be positioned on a surface and/or mounted to a wall (e.g., 208, FIG. 12). Bits may be positioned within the first bit storage area 98 and/or the second bit storage area 114 of the rotary tool 10 or the bit storage area 204 of rotary tool assembly 310. A battery 66 or power source may be connected to the main body 14 to provide electrical power to a motor positioned within the main body 14. The rotary tool may be removed from the docking portion 42. The spindle lock switch assembly 522 may be slidably moved relative the housing from the first position to the second position to lock the spindle 514. A portion of the bit holder assembly 62 may be rotated relative the spindle 514 in a first direction 542 for insertion of a selected bit. The bit holder assembly 62 may be rotated in a second direction 546 to secure the bit within a collet or other portion of the bit holder assembly 62. The spindle lock switch assembly 522 may be slidably moved to the off position. The power switch 86 may be moved to the on position to provide electrical power from the battery 66 to the motor. The motor may transfer rotational power through the flexible member 58 to the spindle 514 of the rotary tool 40. The speed switch 90 may be adjusted to a desired rotational speed for the desired application. In this way the bit in the rotary tool assembly may be caused to perform a grinding operation, a polishing operation, a cutting operation, and/or the like.

Various features and advantages of the present subject matter are set forth in the following claims.

The invention claimed is:

1. A rotary tool assembly comprising;
- a main body;
- a motor disposed in the main body;
- a power source coupled to the main body, the power source being configured to provide electrical power to the motor;
- a rotary tool attached to the main body, the rotary tool configured to be actuated by the motor;
- a first bit storage area disposed on the main body, the first bit storage area defining a storage cavity configured to receive a first bit, the first bit storage area being a drawer that is slidable between a first position in which the storage cavity is accessible and a second position in which the storage cavity is concealed; and
- a second bit storage area disposed on the main body, the second bit storage area being a tray configured to receive a second bit, the second bit storage area including a cavity having a bottom surface underlying the tray, the cavity selectively accessible to receive a bit, the tray being movable to allow access to the cavity, the bottom surface of the tray including a plurality of stepped surfaces configured to position the second bit at any one height of a plurality of different heights;
- wherein in the second position of the first bit storage area, the first bit storage area and the second bit storage area are stacked upon one another.

2. The rotary tool assembly of claim 1, wherein at least one of the first bit storage area and the second bit storage area is removably coupled to the main body.

3. The rotary tool assembly of claim 1, further comprising a plurality of apertures arranged on the tray in a plurality of groups.

4. The rotary tool assembly of claim 1, wherein the tray is removably coupled to a top portion of the main body of the rotary tool assembly.

5. The rotary tool assembly of claim 1, wherein one of the first bit storage area or the second bit storage area includes a cover.

6. The rotary tool assembly of claim 1, wherein the rotary tool further comprises:
- a housing;
- a spindle positioned within the housing; and
- a slidable spindle lock switch positioned on the housing, wherein:
  - the spindle is caused to rotate when the spindle lock switch is in a first position, and
  - the spindle is caused to not rotate when the spindle lock switch is in a second position.

7. The rotary tool assembly of claim 6, wherein:
- the spindle comprises a locking structure, and
- a portion of the spindle lock switch is configured to engage the locking structure for locking the spindle.

8. The rotary tool assembly of claim 1, further comprising:
- a flexible member extending between the rotary tool and the main body, the flexible member operatively coupling the motor to the rotary tool,
- wherein the main body includes a docking portion, and
- wherein the docking portion is configured to receive the rotary tool in a docked position where the rotary tool is coupled to the main body, and the rotary tool is removable from the docking portion such that the rotary tool is operable while not received by the docking portion.

9. The rotary tool assembly of claim 8, wherein
one or more apertures are formed in the tray.

10. The rotary tool assembly of claim 9, wherein:
the tray extends along a tray axis, and
the one or more apertures are obliquely angled respective to the tray axis.

11. The rotary tool assembly of claim 9, wherein at least one aperture of the plurality of apertures has a uniform diameter along a length of the at least one aperture.

12. The rotary tool assembly of claim 9, wherein at least one aperture of the plurality of apertures has a non-uniform diameter along a length of the at least one aperture.

13. The rotary tool assembly of claim 9, wherein the tray is removably coupled to the main body of the rotary tool assembly.

14. The rotary tool assembly of claim 1, wherein
the rotary tool includes:

a spindle configured to be rotated by the motor about a spindle axis, and
a spindle lock switch disposed proximate to the spindle, the spindle lock switch being slidable along the spindle axis, the spindle being rotatable when the spindle lock switch is in a first position, the spindle being stationary when the spindle lock switch is in a second position, the spindle lock including a switch member formed of a first material and a locking member formed of a second material different than the first material.

15. The rotary tool assembly of claim 14, wherein the spindle comprises a locking structure.

16. The rotary tool assembly of claim 15, wherein the locking structure comprises a collar having a recess configured to receive a portion of the slidable spindle lock switch.

* * * * *